INVENTORS.
Robert M. Sharp,
Ide P. Trotter, Jr.,
Hermann E. vonRosenberg,
BY

April 19, 1966    R. M. SHARP ETAL    3,246,960
CATALYTIC CONVERSION APPARATUS
Filed Nov. 17, 1961    2 Sheets-Sheet 2

INVENTORS.
Robert M. Sharp,
Ide P. Trotter, Jr.,
Hermann E. vonRosenberg,
BY
ATTORNEY.

United States Patent Office 3,246,960
Patented Apr. 19, 1966

---

3,246,960
CATALYTIC CONVERSION APPARATUS
Robert M. Sharp, Ide P. Trotter, Jr., and Hermann E. von Rosenberg, all of Baytown, Tex., assignors to Humble Oil & Refining Company
Filed Nov. 17, 1961, Ser. No. 153,067
7 Claims. (Cl. 23—288)

The present invention is directed to apparatus and method for intimately contacting solids and fluids such as in catalytic conversions. More particularly, the invention is concerned with the catalytic cracking of hydrocarbons. In its more specific aspects, the invention is concerned with the catalytic cracking of hydrocarbons wherein improved cracking of the hydrocarbons is obtained.

The present invention may be briefly described as apparatus for catalytic conversions wherein a vertical elongated conduit having a cross-sectional diameter at its lower end at least as its great cross-sectional diameter at its upper end is provided. The elongated conduit is also provided with means adjacent the lower end thereof for introducing a finely divided catalyst into the conduit. The upper end of the conduit has an outlet means for removing converted products and catalyst. Extending into the lower end of said conduit past the means for introducing catalyst into the conduit is a plurality of horizontally spaced apart feed inlet means. The feed inlet means may be in the form of concentric pipes to provide an annular feed inlet through the inner pipe of which is introduced an inert gasiform fluid, such as steam. The lower end of the elongated conduit has a flat end through which the feed inlet means extend.

The preset invention also involves a method for catalytically converting an organic compound which comprises forming a suspension of a finely divided catalyst in heated vapors of the organic compound and then flowing the suspension at a substantially uniform horizontal cross-sectional velocity and density through a vertical elongated conversion zone under conversion conditions whereby improved conversion of the compound into valuable products is obtained. While velocity increases with conversion up the reactor (outlet velocity 2 to 3 times inlet velocity) the cross-sectional velocity is substantially uniform.

While the invention is broadly directed to catalytic conversion of organic compounds, it is specifically directed to catalytic cracking of hydrocarbons. While the feed stock of the present invention may be any fluid such as an organic compound which is to be contacted with any particulate solid to achieve chemical or thermal changes by conversion thereof to valuable products, the invention is also concerned with feed stocks such as crude petroleum fractions and the like, such as those boiling in the range from about 100° to about 1300° F. Thus, the invention may be practiced with gasoline fractions, kerosene fractions, middle distillate or heating oil fractions, process gas oil fractions, vacuum gas oil fractions and the like. A valuable feed stock is a crude petroleum fraction, such as those in the range indicated. A preferred feed stock is a gas oil fraction which may be a converted fraction or virgin crude petroleum fraction.

Conditions employed in the practice of the present invention will suitably include a temperature in the range from about 800° to about 1200° F., preferably, a temperature between 900° to 1100° F.

Pressures may suitably range from about atmospheric pressure up to about 50 p.s.i.g. A suitable pressure may range from about atmospheric pressure to about 30 p.s.i.g.

The velocity of the suspension is suitably within the range from about 5 to about 150 feet per second, preferably, from about 15 feet to about 60 feet per second.

The solids density is suitably within the range from about 0.5 to about 30 lbs. per cubic foot with a preferred range from about 1 to about 6 lbs. per cubic foot. Thus, in the practice of the present invention, the reaction is conducted in a so-called disperse phase, that is, the catalyst is suspended in the hydrocarbons and the suspension has an average density within the range from about 1 lb./cu. ft. to about 6 lbs./cu. ft.

The catalyst employed in the practice of the present invention is a finely divided conversion catalyst, such as a cracking catalyst. A silica-alumina catalyst may suitably be employed, but slilica-magnesia, silica-zirconia, and the like may be used.

The catalyst is in a finely divided condition, having a particle size within the range from about 0.01 micron up to 150 microns with a major amount of the catalyst having a particle size within the range from about 20 to about 80 microns.

The present invention will be more completely described by reference to the drawing in which.

Figure 1:
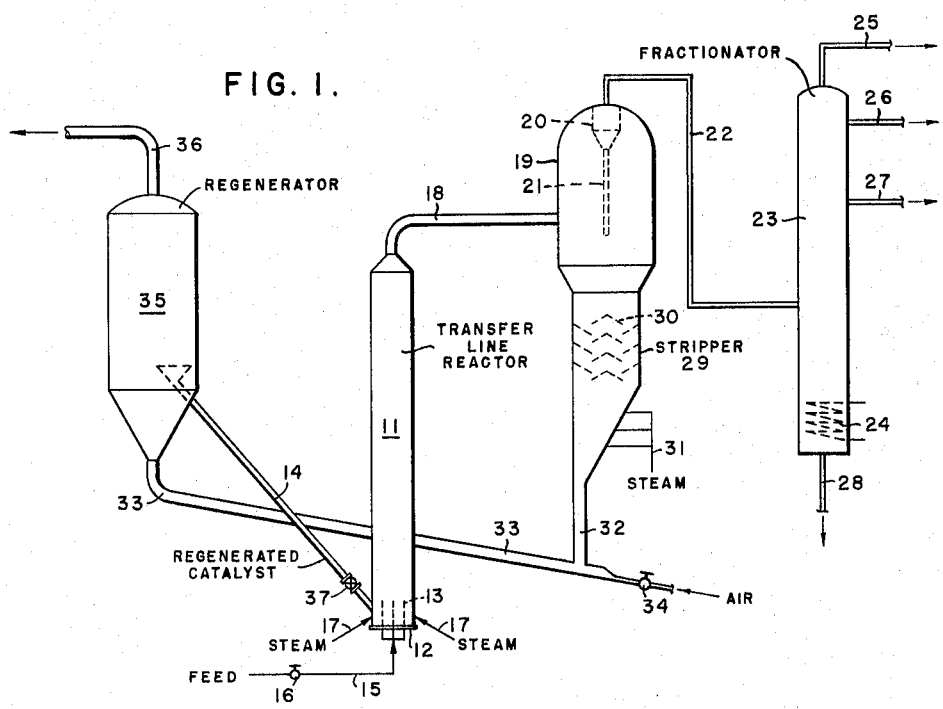
FIG. 1 is a flow diagram of a preferred mode of practicing the invention.

Referring now to FIG. 1 numeral 11 designates a transfer line reactor having a substantially uniform cross-sectional diameter from its lower end to its upper end. The lower end of the transfer line reactor 11 is closed by a plate member 12 through which extend horizontally spaced apart feed inlet means 13 which extend into the reactor 11 past the point where the line 14, through which catalyst is introduced into the transfer line reactor, connects thereinto adjacent the end closed by the plate member 12. Connecting to the feed inlet means is a feed line 15, controlled by valve 16, which connects into a source of feed (not shown). Intermediate the lower end of the line 14 are steam inlet lines 17 by way of which steam is introduced into the reactor 11 to fluidize the catalyst introduced by the line 14. The transfer line reactor 11 is provided with an outlet 18, which discharges into a vessel 19 wherein a rough separation is made between the catalyst and the cracked prouduct, the catalyst fines being separated from the cracked product by a cyclone separation means 20, provided with a dip-leg 21, which discharges the catalyst into the vessel 19. The crude products are discharged from the vessel 19 by way of line 22 and are introduced thereby into a fractionator 23 which may be a plurality of fractional distillation zones suitably equipped with all auxiliary equipment usually associated with commercial distillation towers. This equipment includes, for example, internal vapor-liquid contacting means, cooling and condensing means, means for inducing reflux, and heating or cooling means and the like in the bottom of the tower. The heating or cooling means is illustrated by an internal coil 24, but this temperature adjusting means may suitably be an external reboiler or furance if needed or may be a pumparound and quench stream for cooling as may be desired. Fractionator 23 is provided with lines 25, 26, 27 and 28 by way of which the various cracked products may be withdrawn. Thus, line 25 may discharge the lighter fractions including gas; lines 26 and 27 may discharge the intermediate fractions; while the heavy fractions may be discharged by line 28, which may include any catalyst carried over from the separator 20. It may be desirable to recycle the intermediate and heavy fractions to the line 11, as may be desired.

The catalyst discharged by line 18 and by line 21 flows downwardly into a stripper section 29 of vessel 19, the stripper section being provided with baffle means 30, and with a steam inlet line 31 to provide stripping steam for contact with the downwardly moving catalyst to remove volatiles such as vaporizable hydrocarbons therefrom. The catalyst, substantially free of volatiles, is discharged from the stripper 29 by line 32 and introduced thereby into line 33 wherein it is mixed with air by manipulation of valve 34. Line 33 carries the catalyst and air mixture into a regenerator 35 wherein the catalyst is regenerated by burning off the nonvolatile materials, such as coke, to regenerate the catalyst for reuse. The regenerator 35 may be a conventional regenerator vessel such as has been described in the literature. Thus, regenerator vessel 35 may be of the up-flow type wherein a burning operation takes place, and the catalyst and the products of combustion are routed into a separate vessel from whence the combustion products are separated from the catalyst. More desirably, the regenerator vessel 35 may be of the downflow type wherein the catalyst is regenerated in a dense bed by burning off the nonvolatiles, including coke. In such instance, the products of combustion are separated from the catalyst by means of internal cyclone separators (not shown), with the products of combustion being discharged by line 36. The regenerated catalyst is withdrawn from regenerator 35 by line 14, controlled by valve 37, and introduced thereby into reactor 11.

Figure 2:
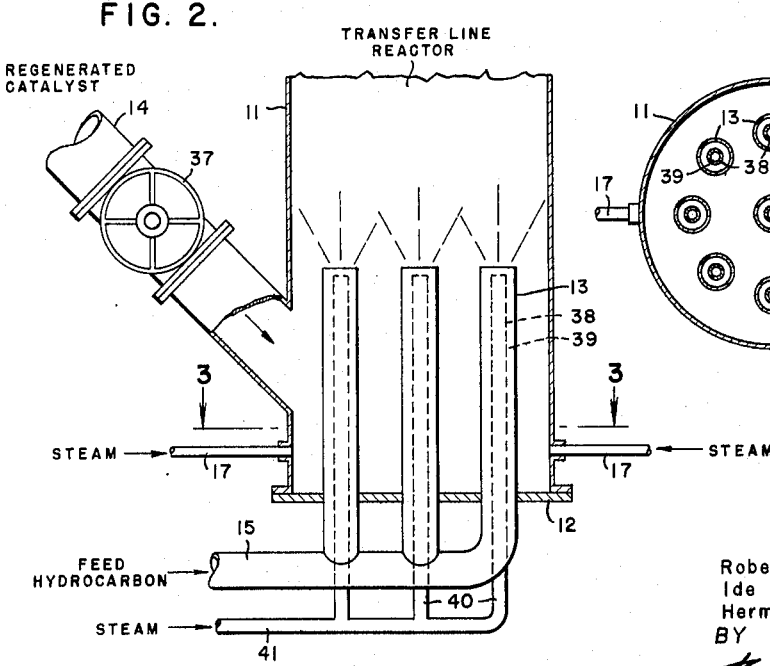
FIG. 2 is an enlarged partial view in section of the reactor of FIG. 1.
Figure 3:
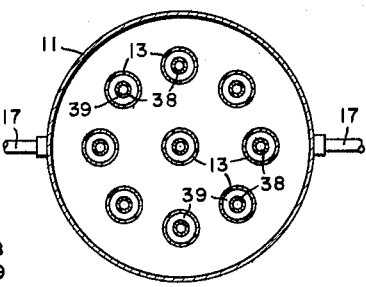
FIG. 3 is a view taken along the lines 3—3 of FIG. 2.

Referring now to FIGS. 2 and 3 wherein identical numerals designate identical parts to FIG. 1, it will be noted that the inlet means 13 each have an inner pipe or conduit 38 which forms an annulus 39 through which the feed is introduced by line 15. It is important that a plurality of horizontally spaced apart feed inlet means be employed and that the feed inlet means be so arranged that the feed is uniformly admixed with the catalyst throughout a given cross-section of the reaction zone. Thus, it is to be emphasized that not only must the feed be introduced coaxially but it also must be introduced peripherally and throughout the cross-section of the reaction zone. To achieve this end, and as shown more clearly in FIG. 3, the feed inlet means are spaced around the periphery, at the axis, and across the chords of the reaction zone. The number of feed inlet means may vary widely but at least three and preferably from three to twenty inlet means may be used. The inlet means may be regularly or irregularly arranged so long as the feed is introduced to form a uniform suspension and to maintain same uniform as it flows through a given cross section of the reaction zone. The inner pipes 38 are connected by a manifold 40 to a steam line 41 to allow steam to be introduced coaxially with the feed to insure proper mixing of the feed with the regenerated catalyst introduced by line 14. Since the steam inlet lines 17 are intermediate the plate 12 closing the lower end of the reactor 11 and the line 14, the steam lines 17 serve to fluidize initially the catalyst introduced by line 14. Thus, the feed inlets 13 extend past the catalyst inlet line 14 and thus allow axial acceleration of the catalyst and oil mixture. In passing, it must be mentioned that the feed hydrocarbons introduced by line 15 may be introduced in a liquid, partially liquid, or all vapor condition. Liquid hydrocarbons are vaporized by contact with the heated catalyst introduced by line 14. The catalyst introduced by line 14 is suitably at a temperature from about 1000° to about 1300° F. as a result of the regeneration operation.

Figure 5:
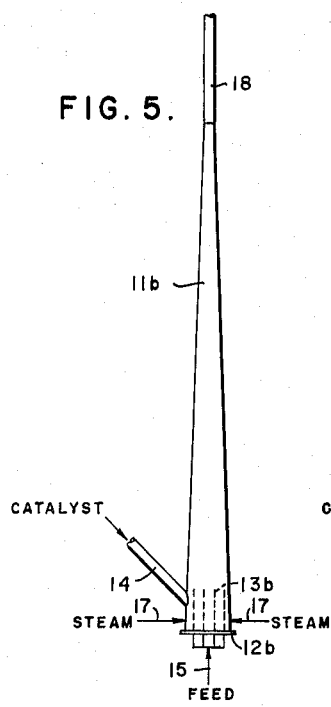
FIG. 5 is a modification of the reactor of FIG. 1.
Figure 6:
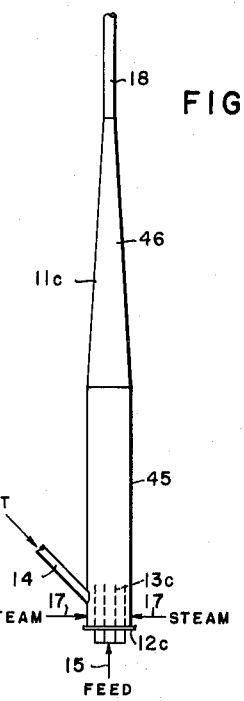
FIG. 6 is a further modification of the reactor of FIG. 1.

Referring now to FIGS. 5 and 6 wherein identical numerals will identify identical parts, a reactor 11b connects the outlet line 18 to a catalyst vessel 19. Catalyst inlet line 14 connects to the reactor 11b which is in the form of a cone with sloping sides inwardly tapering from the base of the cone. The lower end of the reactor 11b is closed by a plate 12b, through which extend feed inlet means 13b, which are similar to inlet means 13. Line 15 connects into the feed inlet means 13b and steam lines 17 connect into reactor 11b adjacent the lower end closed by the plate 12b and intermediate the line 14 and the lower end of the reactor.

Referring now to FIG. 6, another modification of the reactor is shown. In this particular instance, the reactor 11c has a portion of its wall of substantially uniform diameter which then tapers inwardly towards its upper end, thus the reactor 11c has a section 45 which is straight sided and of substantially uniform diameter and has a second section 46 which is conically shaped. The upper end of section 46 connects into line 18, and the lower end of the section 45 is closed by a plate member 12c, through which extends feed inlet means 13c, which are similar to feed inlet means 13 and 13b. Catalyst line 14 connects into the section 45 adjacent the lower end thereof and steam lines 17 connect into the section 45 between the catalyst line 14 and the plate member 12c. Feed inlet line 15 connects into the inlet means 13c.

In the embodiments and modes of FIGS. 5 and 6 the taper of the cone is within the range from 88° to about 10°, the angle being measured from the flat-sided base or closed lower end with respect to the embodiment of FIG. 5. A preferred angle is within the range from about 75° to about 45°. This angle applies to both embodiments. With respect to FIG. 6, the angle is measured from a horizontal line between the sections 41 and 42 which forms the base of the cone section 42. Employing a tapered reactor in catalytic cracking operations allows maintenance of more uniform cross-sectional velocity and density than heretofore possible.

The several embodiments of the present invention illustrated in the drawing describe either cylindrical or conical reactors. Thus, the reactor is circular in horizontal cross-section in either embodiment.

In the practice of the present invention, the catalyst enters through sloped side pipes, such as line 14, and is picked up by feed entering through nozzles that extend beyond the catalyst inlet. The practice of the present invention has shown that improved operations are obtained wherein a substantially more uniform cross-sectional velocity and density are maintained as the suspension of catalyst in vapors of the feed are flowed under conversion conditions through a vertical elongated zone. Thus, it has been shown that where the density and velocity are flowed through a cross sections of the reaction zone, substantially more uniform and improved results are obtained. While the cross-sectional velocity and density are uniform, the velocity of the flow through the reactor of the present invention increases because of the conversion of the feed stock, and the density decreases because of conversion by virtue of the large amount of vaporous and gaseous material formed. However, in accordance with the present invention, there is substantial approach to piston flow through the reaction zone in that the velocity and density at any radius across the reaction zone is substantially more uniform than in prior art.

Figure 4:
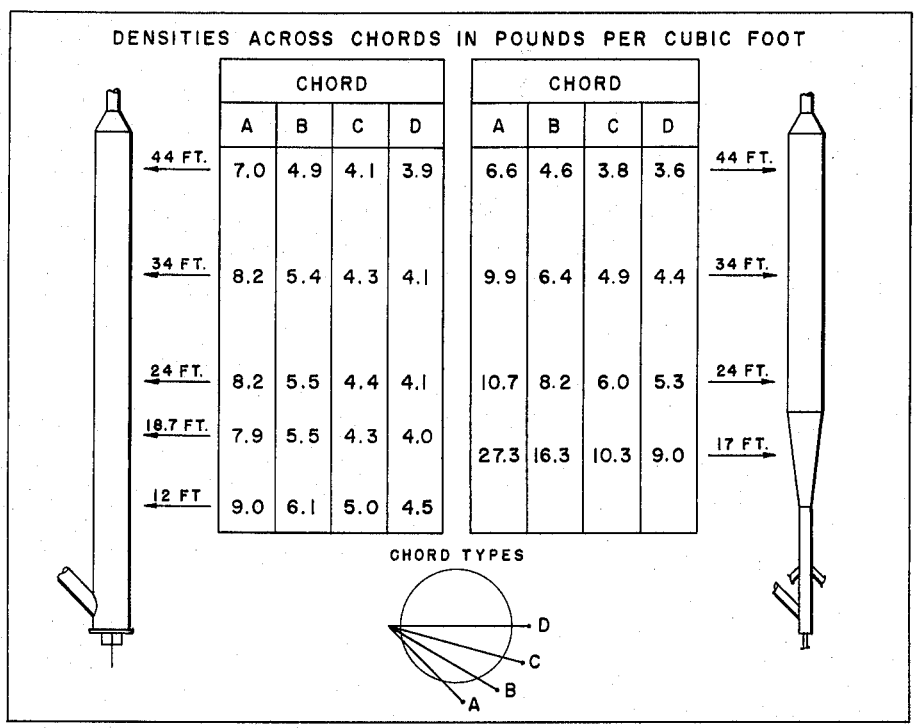
FIG. 4 is a chart of data illustrating a comparison of the present invention with the prior art.

In order to illustrate this feature and to show the improvement of the present invention over the prior art, reference is had to FIG. 4 where densities obtained throughout the reactor of the present invention and that of the prior art are compared. The densities were obtained by providing at various levels of the vertical reactor a source of radiation, such as cobalt 60, which was movable peripherally around the reactor. Spaced oppositely from the source of the radiation around the periphery of the two reactors compared were radiation detecting means which were movable simultaneously with movement of the radiation source such that the density of a fluidized mixture flowing through the reaction zones could be determined by the amount of radiation detected by the detecting means. In the data illustrated in FIG. 4, air was used as a fluidizing means for a silica-alumina catalyst and a solids suspension flow of 25 lbs. per square foot per second, and a gas velocity of 12.5 feet per second were employed. The density in pounds per cubic foot across the chords A, B, C and D, as shown in the diagram, were determined at the several intervals indicated at the sides of the chart.

It will be seen from an inspection of the data in FIG. 4 that for each chord, the density was substantially constant throughout the length of the transfer line reactor. Comparing these data with the conventional type of transfer line reactor, it will be seen that substantially uniform cross-sectional densities were obtained in the practice of the present invention; whereas, in the practice of the prior art, the densities vary greatly with the various levels. This is particularly striking where the density measurements were taken in the cone portion of the conventional transfer line reactor, showing conclusively that an upwardly diverging cone does not give results as satisfactory as those obtained with a reaction zone in accordance with this invention, wherein the cross-sectional diameter of the lower end of the reaction zone is at least as great as the cross-sectional diameter of the upper end.

In the improvements of FIGS. 5 and 6, the high velocities generated by using a cone-type base at the lower end reduces any dense fixed bed of catalyst which may tend to form on the walls of the reaction zone. This latter effect and the desirability of the modification of FIGS. 5 and 6 have been amply demonstrated.

In the practice of the present invention, the suspension of catalyst in vaporized hydrocarbon moves through the reaction zone essentially as a piston with little or no backmixing along the sides.

The present invention is quite important and useful in that improved cracking operations are obtained, backmixing is decreased, and the catalyst and hydrocarbon are only in contact for a short period of time. For example, in a reaction zone, such as illustrated in the drawing, the residence time may suitably be within the range from about 0.5 to about 10 seconds with a preferred range from about 1 to about 5 seconds.

The nature and objects of the present invention having been completely described and illustrated and the best mode thereof set forth, what we wish to claim as new and useful and secure by Letters Patent is:

1. Apparatus for catalytic conversions which comprises a vertical elongated conduit having a horizontal circular cross-sectional diameter at its lower end at least as great as its horizontal circular cross-sectional diameter at its upper end, means adjacent the lower end of said conduit for introducing a finely divided solid catalyst into said conduit, outlet means for removing converted products and catalyst from the upper end of said conduit, and a plurality of horizontally spaced apart separate coaxial, peripheral and chordal feed inlet means extending vertically into the lower end of said conduit past said means for introducing said catalyst into said conduit, said conduit having a flat-sided horizontal closed lower end through which said feed inlet means extend.

2. Apparatus in accordance with claim 1 in which the horizontal cross-sectional diameter of the conduit at its lower end is greater than the horizontal cross-sectional diameter at its upper end.

3. Apparatus in accordance with claim 1 in which the horizontal cross-sectional diameter of the elongated conduit is substantially uniform throughout its length.

4. Apparatus for catalytic conversions which comprises a vertical elongated cylindrical conduit having a substantially uniform diameter throughout its length, means adjacent the lower end of said conduit for introducing a finely divided solid catalyst into said conduit, outlet means for removing converted products and catalyst from the upper end of said conduit, and a plurality of at least three horizontally spaced apart separate coaxial, peripheral and chordal feed inlet means extending vertically into the lower end of said conduit past said means for introducing said catalyst into said conduit, said conduit having a flat-sided horizontal closed lower end through which said feed inlet means extend.

5. Apparatus in accordance with claim 4 in which said conduit is provided with means for injecting an inert gasiform fluid into said conduit for fluidizing said catalyst.

6. Apparatus for catalytic conversions which comprises a vertical elongated cylindrical conduit having a substantially uniform diameter throughout its length, conduit means adjacent the lower end of said elongated conduit for introducing a finely divided solid catalyst into said elongated conduit, outlet means for removing converted products and catalyst from the upper end of said elongated conduit, and a plurality of at least three horizontally spaced apart separate coaxial, peripheral and chordal tubular feed inlet means extending vertically into the lower end of said elongated conduit past said means for introducing said catalyst into said elongated conduit, said elongated conduit having a flat-sided horizontal closed lower end through which said feed inlet means extend.

7. Apparatus for catalytic conversions which comprises a vertical elongated cylindrical conduit having a substantially uniform diameter throughout its length, conduit means adjacent the lower end of said elongated conduit for introducing a finely divided solid catalyst into said elongated conduit, injection means connected to said elongated conduit intermediate the lower end thereof and said conduit means, outlet means for removing converted products and catalyst from the upper end of said elongated conduit, and a plurality of at least three horizontally spaced apart separate coaxial, pripheral and chordal tubular feed inlet means extending vertically into the lower end of said elongated conduit past said means for introducing said catalyst into said elongated conduit, said elongated conduit having a flat-sided horizontal closed lower end through which said feed inlet means extend.

References Cited by the Examiner

UNITED STATES PATENTS

| | | | |
|---|---|---|---|
| 2,799,095 | 7/1957 | May et al. | 23—288.3 |
| 2,901,420 | 8/1959 | Evans | 208—153 |
| 2,937,988 | 5/1960 | Polack | 208—157 |
| 2,985,517 | 5/1961 | Harper | 23—288.3 |
| 2,994,659 | 8/1961 | Slyngstad et al. | 208—153 |
| 3,041,273 | 6/1962 | Smith et al. | 208—153 |
| 3,152,065 | 10/1964 | Sharp et al. | 208—158 |

DELBERT E. GANTZ, *Primary Examiner.*
ALPHONSO D. SULLIVAN, *Examiner.*
M. H. SILVERSTEIN, P. P. GARVIN, H. LEVINE,
*Assistant Examiners.*